(12) United States Patent
Ozeki (10) Patent No.: US 11,958,166 B2
(45) Date of Patent: Apr. 16, 2024

(54) DRESSING ESTIMATION DEVICE AND CONTROLLER

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1007 days.

(21) Appl. No.: 16/826,952

(22) Filed: Mar. 23, 2020

(65) Prior Publication Data

US 2020/0331116 A1 Oct. 22, 2020

(30) Foreign Application Priority Data

Apr. 19, 2019 (JP) .................................. 2019-079989

(51) Int. Cl.
*B24B 53/08* (2006.01)
*G06N 20/00* (2019.01)

(52) U.S. Cl.
CPC ............. *B24B 53/08* (2013.01); *G06N 20/00* (2019.01)

(58) Field of Classification Search
CPC ...... G06N 20/00; G06Q 10/04; B24B 41/062; B24B 7/228
See application file for complete search history.

(56) References Cited

U.S. PATENT DOCUMENTS

| 6,652,358 | B1 * | 11/2003 | Ikeda | B24B 41/062 |
| | | | | 451/264 |
| 9,278,398 | B2 * | 3/2016 | Yanase | B24B 53/085 |
| 9,656,370 | B2 * | 5/2017 | Yoshida | B24B 7/228 |
| 2009/0165274 | A1 * | 7/2009 | Sensui | F16C 33/64 |
| | | | | 29/33 R |

(Continued)

FOREIGN PATENT DOCUMENTS

| CN | 102335872 | 2/2012 |
| JP | 2001-205562 | 7/2001 |

(Continued)

OTHER PUBLICATIONS

Notification of Reason for Refusal dated Oct. 12, 2021 in corresponding Japanese Patent Application No. 2019-079989.

*Primary Examiner* — Saba Dagnew
(74) *Attorney, Agent, or Firm* — Wenderoth, Lind & Ponack, L.L.P.

(57) ABSTRACT

An optimal timing to perform dressing on a grindstone is detected easily. A machine learning device includes: an input data acquisition unit that acquires input data including an arbitrary grinding condition for an arbitrary work material in a grinding process of an arbitrary grinding machine and grindstone information related to an arbitrary grindstone including at least a degree of necessity of dressing process indicating a degree of necessity of dressing before a grinding process is performed under the grinding condition; a label acquisition unit that acquires label data indicating the degree of necessity of dressing process of the grindstone after the (Continued)

SHEDDING

PERFORM GRINDING → LOADING

NORMAL

GLAZING grinding process is performed under the grinding condition included in the input data; and a learning unit that executes supervised learning using the input data acquired by the input data acquisition unit and the label data acquired by the label acquisition unit, and generates a learned model.

6 Claims, 8 Drawing Sheets

(56) References Cited

U.S. PATENT DOCUMENTS

| | | | |
|---|---|---|---|
| 2012/0191235 A1* | 7/2012 | Shin | G06Q 10/04 700/104 |
| 2016/0267396 A1* | 9/2016 | Gray | G06N 20/00 |
| 2017/0190018 A1* | 7/2017 | Shibuya | B24B 53/007 |

FOREIGN PATENT DOCUMENTS

| | | |
|---|---|---|
| JP | 2002-307304 | 10/2002 |
| JP | 2018-41208 | 3/2018 |
| JP | 2018-118372 | 8/2018 |
| JP | 2020-15129 | 1/2020 |

* cited by examiner

| GRINDSTONE ID | GRINDSTONE INFORMATION | | | | |
|---|---|---|---|---|---|
| | GRINDSTONE NAME | GRINDSTONE TYPE | GRAIN TYPE | ... | PRESENT DEGREE OF NECESSITY OF DRESSING PROCESS |
| 1 | GRINDSTONE A | FLAT TYPE | ALUMINA | ... | 70% |
| 2 | GRINDSTONE B | FLAT TYPE | ALUMINA | ... | 20% |
| ... | ... | ... | ... | ... | ... |
| n | GRINDSTONE N | RING TYPE | SILICON CARBIDE | ... | 45% |

DRESSING ESTIMATION DEVICE AND CONTROLLER

This application is based on and claims the benefit of priority from Japanese Patent Application No. 2019-079989, filed on 19 Apr. 2019, the content of which is incorporated herein by reference.

BACKGROUND OF THE INVENTION

Field of the Invention

The present invention relates to a machine learning device, a dressing estimation device, and a controller.

Related Art

When a grindstone is used for grinding, "shedding" wherein grains in a portion of the surface of the grindstone fall, "loading" wherein chips or fragments of a workpiece or the like clog between the grains on the surface of the grindstone, or "glazing" wherein the grains on the surface of the grindstone are worn away may occur, and as a result, machining quality and sharpness decrease. In this case, in order to restore machining quality and sharpness, dressing is performed to make the surface of the grindstone sharp.

Figure 1:
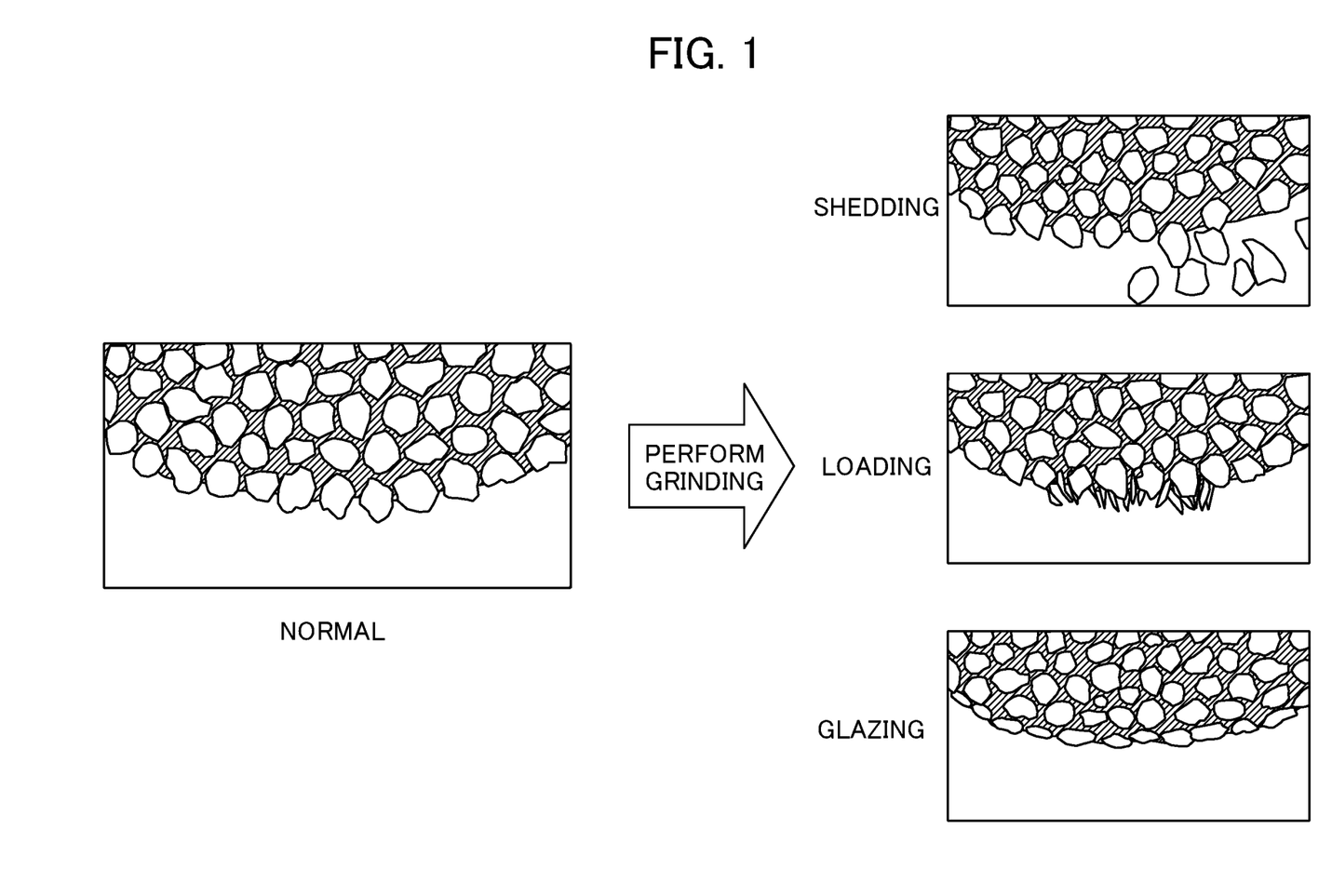
FIG. 1 is a diagram illustrating an example of a state of the surface of a grindstone.

FIG. 1 is a diagram illustrating an example of the state of a grindstone. The left side of FIG. 1 illustrates a normal state in which grains protrudes uniformly from the surface of a grindstone. On the other hand, the upper part on the right side of FIG. 1 illustrates an example of "shedding" wherein grains in a portion of the surface fall. The middle part on the right side of FIG. 1 illustrates an example of "loading" wherein chips or fragments of a workpiece or the like clog between the grains on the surface. The lower part on the right side of FIG. 1 illustrates an example of "glazing" wherein the grains on the surface are worn away. Shaded portions indicate a binder that binds grains together.

A technique of detecting a timing to perform dressing of a grindstone on the basis of comparison between a measurement value such as sound and vibration generated during grinding and a threshold set in advance. For example, see Patent Documents 1 and 2.

Patent Document 1: Japanese Unexamined Patent Application, Publication No. 2001-205562

Patent Document 2: Japanese Unexamined Patent Application, Publication No. 2002-307304

SUMMARY OF THE INVENTION

However, since the sound or vibration generated changes according to the type of a grindstone, the material of a work to be grinded, and the like, it is necessary to set the threshold according to the type of a grindstone and the material of a workpiece to be grinded, which takes a considerable amount of time.

Therefore, it is desirable to detect an optimal timing to perform dressing of a grindstone easily.

(1) An aspect of a machine learning device of the present disclosure includes: an input data acquisition unit that acquires input data including an arbitrary grinding condition for an arbitrary work material in a grinding process of an arbitrary grinding machine and grindstone information related to an arbitrary grindstone including at least a degree of necessity of dressing process indicating a degree of necessity of dressing before a grinding process is performed under the grinding condition; a label acquisition unit that acquires label data indicating the degree of necessity of dressing process of the grindstone after the grinding process is performed under the grinding condition included in the input data; and a learning unit that executes supervised learning using the input data acquired by the input data acquisition unit and the label data acquired by the label acquisition unit, and generates a learned model.

(2) An aspect of a dressing estimation device according to the present disclosure includes: a learned model generated by the machine learning device according to (1); an input unit that inputs a grinding condition for a grinding target work material related to the grinding process prior to a grinding process of the grinding machine and grindstone information related to a grindstone to be used in the grinding process, including at least the present degree of necessity of dressing process; and an estimation unit that estimates a degree of necessity of dressing process after a grinding process is performed under the grinding condition related to the grinding process with respect to a grindstone to be used in the grinding process, input by the input unit using the learned model.

(3) An aspect of a dressing estimation device according to (2) includes the machine learning device according to (1).

(4) An aspect of a controller of the present disclosure includes the dressing estimation device according to (2) or (3).

According to an aspect, it is possible to easily detect an optimal timing to perform dressing of a grindstone.

DETAILED DESCRIPTION OF THE INVENTION

Hereinafter, an embodiment of the present disclosure will be described with reference to the drawings.

Embodiment

Figure 2:
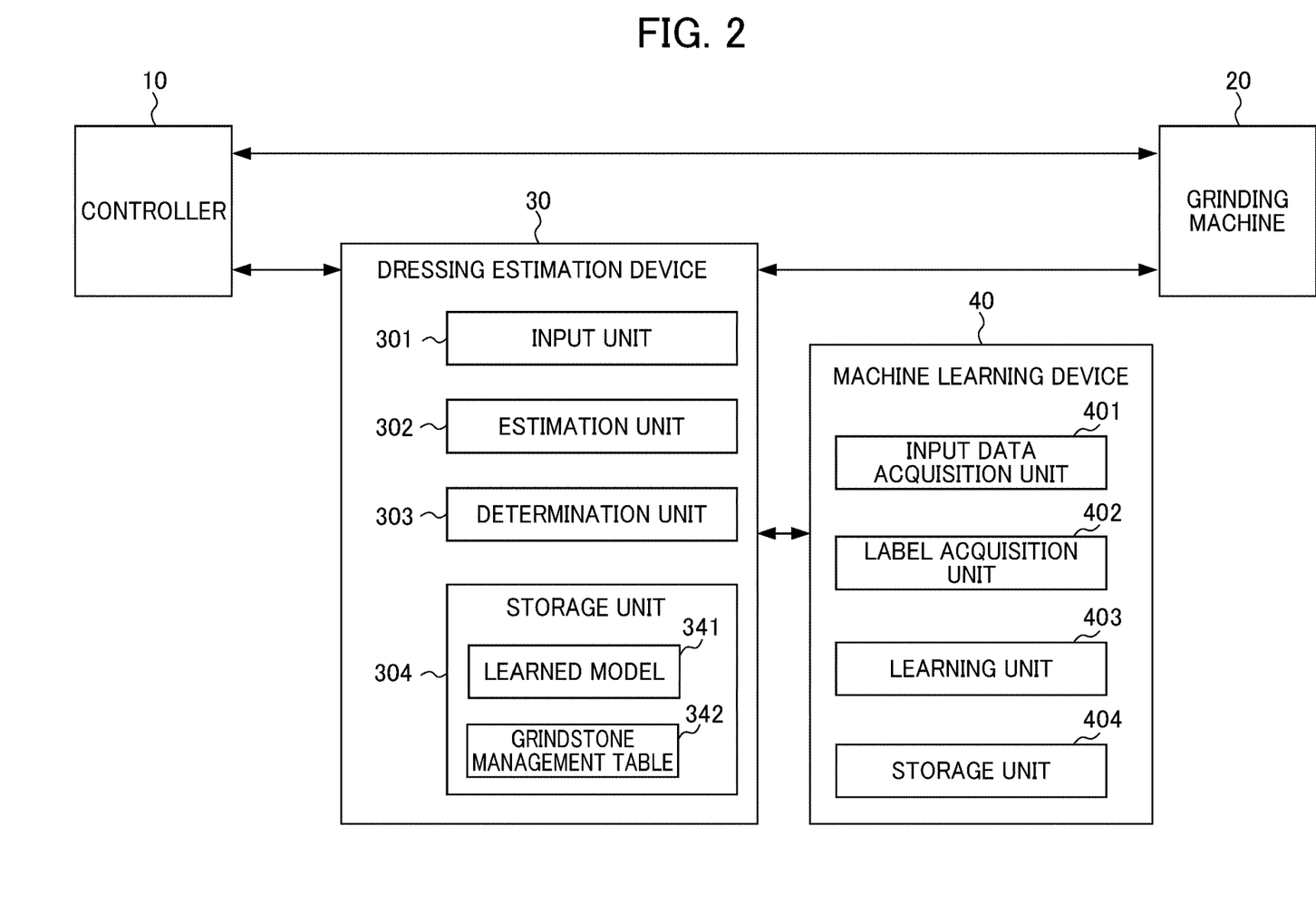
FIG. 2 is a functional block diagram illustrating a functional configuration example of a numerical control system according to an embodiment.

FIG. 2 is a functional block diagram illustrating a functional configuration example of a numerical control system according to an embodiment. As illustrated in FIG. 2, the numerical control system includes a controller 10, a grinding machine 20, a dressing estimation device 30, and a machine learning device 40.

The controller 10, the grinding machine 20, the dressing estimation device 30, and the machine learning device 40 may be connected directly to each other via a connection interface (not illustrated). Moreover, the controller 10, the grinding machine 20, the dressing estimation device 30, and the machine learning device 40 may be connected to each other via a network (not illustrated) such as a local area network (LAN) or the Internet. In this case, the controller 10, the grinding machine 20, the dressing estimation device 30, and the machine learning device 40 have a communication unit (not illustrated) for performing communication with each other via the connections. As will be described later, the controller 10 may include the dressing estimation device 30 and the machine learning device 40. Moreover, the grinding machine 20 may include the controller 10.

The controller 10 is a numerical controller which is well known to those skilled in the art. The controller 10 generates an operation command on the basis of control information and transmits the generated operation command to the grinding machine 20. In this way, the controller 10 controls an operation of the grinding machine 20. Moreover, the controller 10 outputs the control information to the dressing estimation device 30. The control information includes a machining program and the values of parameters set to the controller 10.

Moreover, the controller 10 may store a list of identification information (hereinafter also referred to as "grindstone IDs") related to grindstones selectable in the grinding machine 20 in a hard disk drive (HDD) (not illustrated), and the like as a grindstone data table.

The grindstone data table may include grindstone information correlated to each of the grindstone IDs. The grindstone information includes a grindstone type (flat type, ring type, recessed type, tapered cup type, and the like), a grain type (alumina, silicon carbide, cubic boron nitride, and the like), a grit size (the size of grain), a bond type (resin, metal, and vitrified), a bonding level (A (soft) to Z (hard)), a tissue (the magnitudes of pores in a grindstone), the state of a grindstone which may occur during grinding (shedding, glazing, and loading), and a self-edging effect of a grindstone.

The grinding machine 20 is a machine that grinds a workpiece with a grindstone on the basis of the operation command of the controller 10. The grinding machine 20 feeds information indicating an operation state based on the operation command of the controller 10 back to the controller 10.

The present embodiment is not limited to the grinding machine 20 but can be applied to various machines such as a machine tool or an industrial robot that can perform a grinding process.

In an operation phase, the dressing estimation device 30 may acquire a grinding condition for a grinding target workpiece related to a grinding process included in the control information from the controller 10 prior to a grinding process of the grinding machine 20. Moreover, the dressing estimation device 30 may acquire grindstone information of a grindstone selected by an operator of the controller 10, including a degree of necessity of a dressing process indicating at least the degree of necessity of dressing. The dressing estimation device 30 can estimate the degree of necessity of dressing process after a grinding process of the selected grindstone by inputting the acquired grinding condition and the grindstone information of the grindstone to the learned model provided from the machine learning device 40 to be described later.

Before description of the dressing estimation device 30, the "degree of necessity of dressing process" and machine learning for generating a learned model will be described.

<Degree of Necessity of Dressing Process>

As described above, the "degree of necessity of dressing process" indicates the degree of necessity of a dressing process for a grindstone used in a grinding process of the grinding machine 20. For example, since a new grindstone or a grindstone immediately after dressing has the best sharpness, a dressing process is not necessary, and the "degree of necessity of dressing process" of the grindstone is "0%." The "degree of necessity of dressing process" increases with the use of a grindstone and becomes "100%" when it is necessary to perform dressing.

Although the "degree of necessity of dressing process" has a percent value in the range of "0%" to "1001," the "degree of necessity of dressing process" may be a value in the range of "0" to "1," for example.

Moreover, "degree of wear" indicating the degree of wear of a grindstone may be used instead of the "degree of necessity of dressing process." In this case, for example, since a new grindstone or a grindstone immediately after dressing is not used, the "degree of wear" may be "0," and the "degree of wear" of the grindstone when it is necessary to perform dressing may be "100." Alternatively, "degree of sharpness" indicating the degree of sharpness of a grindstone may be used instead of the "degree of necessity of dressing process." In this case, for example, since a new grindstone or a grindstone immediately after dressing is not used, the "degree of sharpness" may be "100", and the degree of sharpness" of a grindstone when it is necessary to perform dressing may be "0".

<Machine Learning Device 40>

The machine learning device 40 acquires, in advance, input data including an arbitrary grinding condition for an arbitrary workpiece in a grinding process of an arbitrary grinding machine and grindstone information on an arbitrary grindstone including at least a degree of necessity of dressing process before the grinding process is performed under the grinding condition, for example.

Moreover, the machine learning device 40 acquires data indicating the degree of necessity of dressing process of a grindstone after a grinding process is performed under the grinding condition of the acquired input data as a label (a correct answer).

The machine learning device 40 performs supervised learning using training data which is a set of the label and the acquired input data and constructs a learned model to be described later.

By doing so, the machine learning device 40 can provide the constructed learned model to the dressing estimation device 30.

The machine learning device 40 will be described in detail.

As illustrated in FIG. 2, the machine learning device 40 includes an input data acquisition unit 401, a label acquisition unit 402, a learning unit 403, and a storage unit 404.

In a learning phase, the input data acquisition unit 401 acquires a grinding condition for an arbitrary grinding target workpiece and grindstone information of an arbitrary grindstone including at least a degree of necessity of dressing process before a grinding process is performed under the grinding condition from the controller 10 or the like as the input data via a communication unit (not illustrated). The input data acquisition unit 401 outputs the acquired input data to the storage unit 404.

The label acquisition unit 402 acquires data indicating the degree of necessity of dressing process of the grindstone after the grinding process is performed under the grinding condition in the input data as label data (correct answer data) and outputs the acquired label data to the storage unit 404.

As described above, the label has a value in the range of "0%" to "100%."

The learning unit 403 receives a set of the input data and the label as training data and performs supervised learning using the received training data to thereby construct a learned model 341 for estimating the degree of necessity of dressing process of a grindstone after the grinding process on the basis of the grinding condition to be performed from now on with respect to the grinding target workpiece and the grindstone information on the selected grindstone.

The learning unit 403 provides the constructed learned model 341 to the dressing estimation device 30.

Here, it is preferable to prepare a number of pieces of training data for performing supervised learning. For example, a skilled operator may create the training data obtained by evaluating the degrees of necessity of dressing process of a grindstone before and after a grinding process for each combination of all grinding conditions and all grindstones. Alternatively, the training data may be acquired from the controllers 10 which is actually operating in various places such as plants of customers. That is, since customers adjust the control information using various pieces of adjustment information in plants of customers and the like, various pieces of training data can be acquired.

Figure 3:
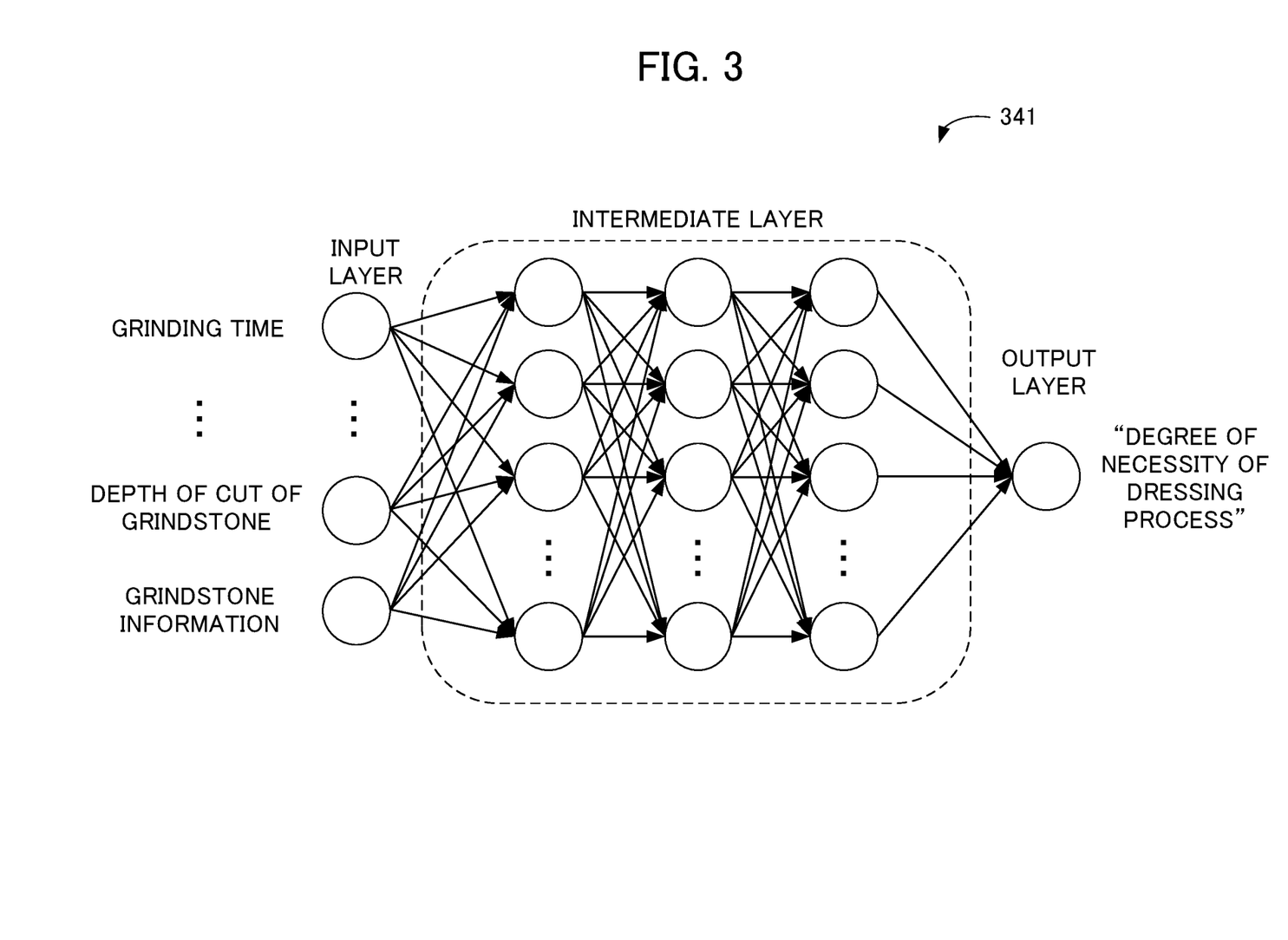
FIG. 3 is a diagram illustrating an example of a learned model provided to a dressing estimation device illustrated in FIG. 2.

FIG. 3 is a diagram illustrating an example of the learned model 341 provided to the dressing estimation device 30 illustrated in FIG. 2. In this example, as illustrated in FIG. 3, the learned model 341 illustrates a multi-layer neural network in which a grinding condition to be performed from now on such as a grinding time or a depth of cut of a grindstone for a grinding target work material and grindstone information of a selected grindstone are used as an input layer and a degree of necessity of dressing process of a grindstone after a grinding process is performed under the grinding condition is used as an output layer.

Here, the grinding condition to be performed from now on includes a work material type (workpiece or tool), a grinding time of a grinding target work material, the geometries of the work material, a material of the work material (metal such as stainless steel or alloy steel and non-metal such as ceramics), presence of a heat treatment (tempering) of the work material, the radius of a grindstone, a rotation speed of a grindstone, a feed rate of a grindstone, and the depth of cut of a grindstone. The geometries of the work material can be acquired by a machining path analyzed on the basis of a computer-aided design (CAD) drawing, an NC program, or the like input to the controller 10.

As illustrated in FIG. 3, although the learned model 341 is a multi-layer neural network in which the grinding condition such as the grinding time or the depth of cut of a grindstone for a grinding target workpiece and the grindstone information of one grindstone are used as an input layer and the "degree of necessity of dressing process" is used as an output layer, there is no limitation thereto. For example, the learned model 341 may be a neural network in which the grinding condition to be performed from now on such as the grinding time for a grinding target workpiece and the grindstone information of a plurality of selected grindstones are used as an input layer and the "degrees of necessity of dressing process" of the plurality of selected grindstones are used as an output layer.

In this way, the dressing estimation device 30 can estimate the "degrees of necessity of dressing process" of the plurality of selected grindstones, and the processing speed can be improved.

When new training data is acquired after the learned model 341 was constructed, the learning unit 403 may perform supervised learning additionally for the learned model 341 to update the learned model 341 already constructed.

Moreover, the learned model 341 may be shared with other dressing estimation devices 30. When the learned model 341 is shared with a plurality of dressing estimation devices 30, supervised learning can be performed by the dressing estimation devices 30 in a distributed manner, and the efficiency of supervised learning can be improved.

The supervised learning may be performed by online learning. Moreover, the supervised learning may be performed by batch learning. Furthermore, the supervised learning may be performed by mini-batch learning.

Online learning is a learning method in which supervised learning is performed whenever grinding is performed by the grinding machine 20 and training data is created. Moreover, batch learning is a learning method in which a plurality of pieces of training data are collected while machining is performed by the grinding machine 20 repeatedly and training data is created repeatedly, and supervised learning is performed using all pieces of collected training data. Furthermore, mini-batch learning is a learning method which is intermediate between online learning and batch learning and in which supervised learning is performed whenever a certain amount of training data is collected.

The storage unit 404 is a random access memory (RAM) or the like and stores the input data acquired by the input data acquisition unit 401, the label data acquired by the label acquisition unit 402, and the learned model 341 constructed by the learning unit 403.

Hereinabove, machine learning for generating the learned model 341 included in the dressing estimation device 30 has been described.

Next, the dressing estimation device 30 in an operation phase will be described. In the following description, the learned model illustrated in FIG. 3, that is, a case in which a multi-layer neural network in which the grinding condition to be performed from now on a work material and the grindstone information for one grindstone are used as an input layer and the "degree of necessity of dressing process" is used as an output layer will be illustrated as the learned model. Moreover, a workpiece is illustrated as a work material.

<Dressing Estimation Device 30 in Operation Phase>

As illustrated in FIG. 2, the dressing estimation device 30 in the operation phase includes an input unit 301, an estimation unit 302, a determination unit 303, and a storage unit 304.

The dressing estimation device 30 includes an arithmetic processing unit (not illustrated) such as a central processing unit (CPU) in order to realize the operation of the functional blocks illustrated in FIG. 2. Moreover, the dressing estimation device 30 includes an auxiliary storage device (not illustrated) such as a read only memory (ROM) and an HDD storing various control programs and/or a main storage device (not illustrated) such as a RAM for storing data required temporarily for the arithmetic processing unit to execute programs.

In the dressing estimation device 30, the arithmetic processing device reads an OS or application software from the auxiliary storage device, and develops the read OS and application software in the main storage device to perform arithmetic processing on the basis of the read OS and application software. The dressing estimation device 30 controls hardware components on the basis of the arithmetic processing result. In this way, the processes of the functional blocks illustrated in FIG. 2 are realized. That is, the dressing estimation device 30 can be realized by cooperation of hardware and software.

The input unit 301 inputs the grinding condition to be performed from now on with respect to the grinding target workpiece related to the grinding process and a grindstone ID indicating a grindstone selected by an operator from the control information of the controller 10, for example, prior to the grinding process of the grinding machine 20. The input unit 301 acquires the grindstone information of the grindstone including at least the present degree of necessity of dressing process on the basis of the input grindstone ID and the grindstone management table 342 stored in the storage unit 304 to be described later.

The input unit 301 outputs the acquired grinding condition to be performed from now on and the grindstone information of the grindstone selected by the operator to the estimation unit 302.

The estimation unit 302 inputs the grinding condition to be performed from now on and the grindstone information of the grindstone selected by the operator to the learned model 341 illustrated in FIG. 2 to estimate a degree of necessity of dressing process after machining is performed by the selected grindstone.

More specifically, the estimation unit 302 can estimate the "degree of necessity of dressing process" of the selected grindstone after a grinding process is performed under the grinding condition by inputting the grinding condition to be performed from now on and the grindstone information of the selected grindstone to the learned model 341. In this way, the estimation unit 302 can estimate the "degree of necessity of dressing process" of the selected grindstone after a grinding process is performed under the grinding condition to be performed from now.

The determination unit 303 may determine a timing before a grinding process as a timing to perform a dressing process on the grindstone when the degree of necessity of dressing process of the selected grindstone after the grinding process exceeds a threshold (for example, 80%). In this case, the determination unit 303 may output an instruction to perform a dressing process on the selected grindstone to an output device (not illustrated) such as a liquid crystal display included in the controller 10 and/or the grinding machine 20. Alternatively, the determination unit 303 may output an instruction for causing an operator to select another grindstone to an output device (not illustrated) of the controller 10 and/or the grinding machine 20.

In this way, the numerical control system can detect whether a dressing process is necessary or not during a grinding process in advance by estimating the degree of necessity of dressing process after a grinding process is performed under the grinding condition to be performed from now on with respect to the grindstone selected by the operator prior to the grinding process of the grinding machine 20.

Furthermore, as will be described later, when there are a plurality of grinding target workpieces included in the grinding condition, the determination unit 303 may adjust the number of grinding target workpieces so that the degree of necessity of dressing process after the grinding process of the grindstone does not exceed a threshold. In this way, the numerical control system can predict in advance the timing at which how much grinding is required for dressing before grinding starts. The numerical control system may stop the grinding machine 20, for example, in a stage where it is good to leave off a grinding process to perform a dressing process of the grindstone or replace the grindstone.

Although the threshold is set to 80%, for example, the threshold may be set appropriately depending on the environment where the grinding machine 20 is installed, and the like.

The storage unit 304 is a ROM, a HDD, or the like and may store the learned model 341 and the grindstone management table 342 together with various control programs.

<Grindstone Management Table 342>

Figure 4:
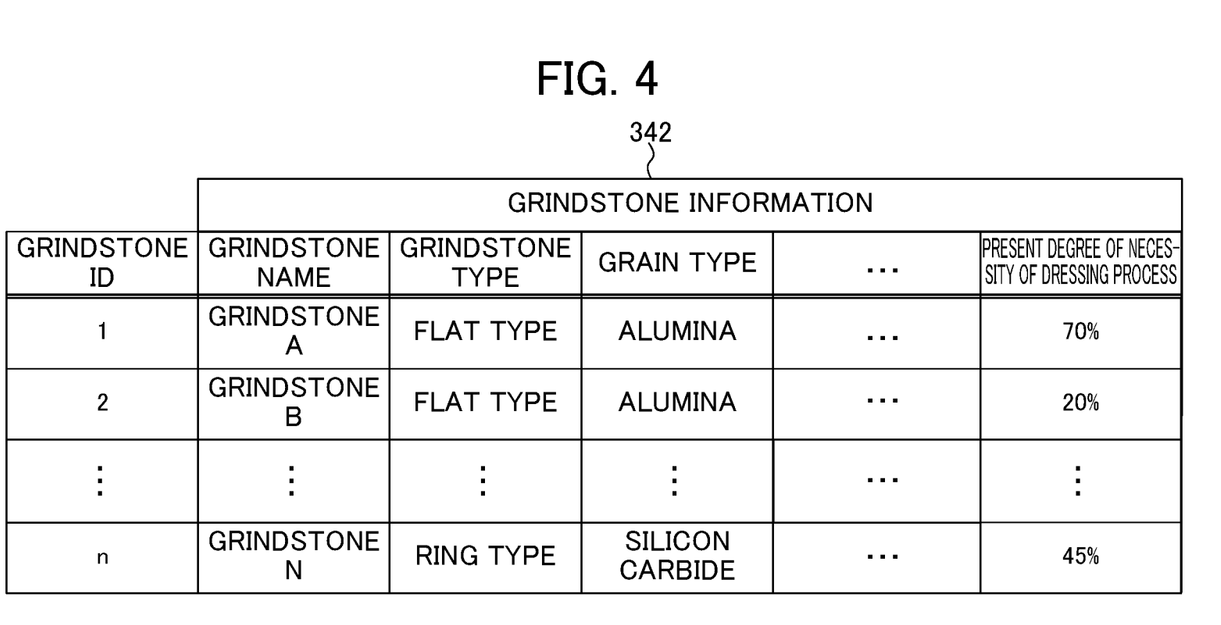
FIG. 4 is a diagram illustrating an example of a grindstone management table.

FIG. 4 is a diagram illustrating an example of the grindstone management table 342. As illustrated in FIG. 4, the grindstone management table 342 includes "grindstone IDs" for identifying all grindstones managed to be usable in grinding processes, respectively. Moreover, the grindstone management table 342 includes "grindstone information" of a grindstone corresponding to a grindstone ID. As described above, the grindstone information includes at least "a grindstone name", "a grindstone type", "a grain type", "a grit size", "a bond type", "bonding level", "a tissue", "a grindstone state which may occur during grinding", "a self-edging effect of grindstone", and "a present degree of necessity of dressing process" in correspondence to the grindstone ID.

The "grindstone ID" in the grindstone management table 342 is information for identifying a grindstone selected by an operator of the controller 10 and is set in advance by the operator. In FIG. 4, although numbers from 1 to n allocated uniquely to grindstones are used as the grindstone ID, an alphabetical letter and the like may also be used as the grindstone ID. Here, n is an integer of 2 or more.

Information indicating the names (grindstone A, grindstone B, . . . , grindstone N) of the grindstones assigned with the grindstone IDs is stored in the "grindstone name" in the grindstone management table 342.

Information indicating the types (flat type, ring type, recessed type, tapered cup type, and the like) of the grindstones assigned with the grindstone IDs is stored in the "grindstone type" in the grindstone management table 342.

Information indicating the grain types (alumina, silicon carbide, cubic boron nitride, and the like) of the grindstones assigned with the respective grindstone IDs is stored in the "grain type" in the grindstone management table 342.

Information indicating the degree of necessity determined by an operator after a previous grinding process was performed for the grindstones assigned with the grindstone IDs is stored in the "present degree of necessity of dressing process" in the grindstone management table 342. That is, the "present degree of necessity of dressing process" in the grindstone management table 342 is input and updated by an operator determining the degree of necessity of dressing process when a grindstone is used for a grinding process.

<Estimation Process of Dressing Estimation Device 30 in Operation Phase>

Next, an operation related to an estimation process of the dressing estimation device 30 according to the present embodiment will be described.

Figure 5:
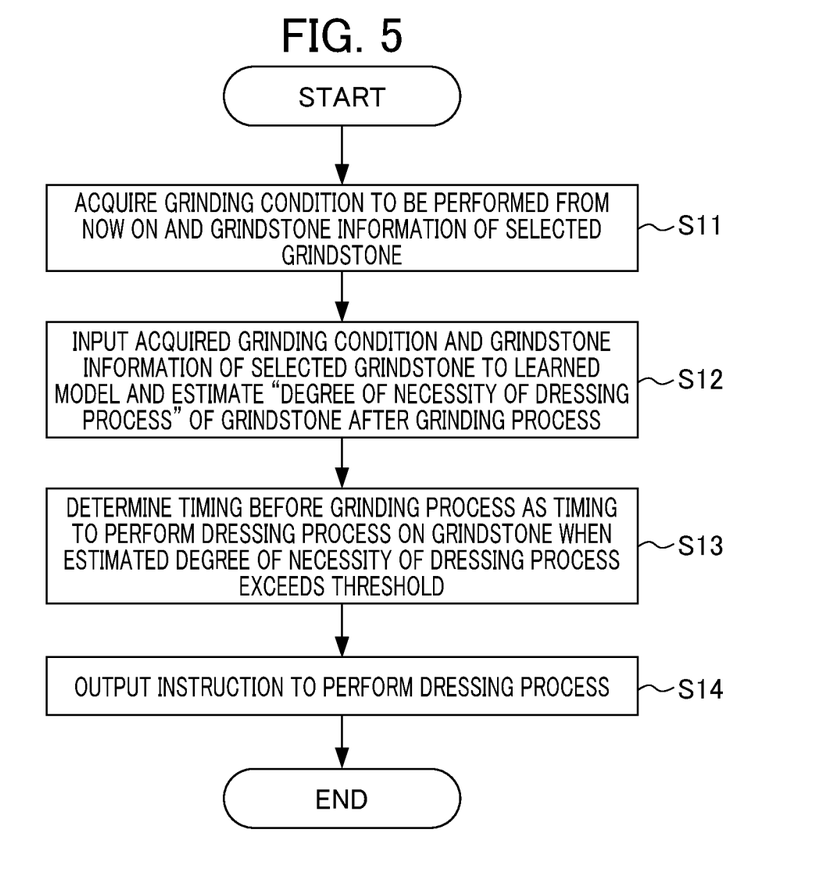
FIG. 5 is a flowchart for describing an estimation process of a dressing estimation device in an operation phase.

FIG. 5 is a flowchart for describing an estimation process of the dressing estimation device 30 in an operation phase.

In step S11, the input unit 301 acquires a grinding condition to be performed from now on for a grinding target workpiece from the control information of the controller 10 prior to the grinding process of the grinding machine 20 and acquires the grindstone information of a grindstone selected by an operator from the grindstone management table 342 on the basis of a grindstone ID.

In step S12, the estimation unit 302 inputs the grinding condition to be performed from now on and the grindstone information of the grindstone selected by the operator acquired in step S11 to the learned model 314 and estimates the "degree of necessity of dressing process" of the selected grindstone after the grinding process.

In step S13, the determination unit 303 determines a timing before the grinding process as a timing to perform a dressing process on the grindstone, when the necessity of the dressing process exceed a threshold, on the basis of the degree of necessity of dressing process of the grindstone estimated in step S12 and a threshold.

In step S14, the determination unit 303 outputs an instruction to perform a dressing process on the grindstone determined in step S13 to an output device (not illustrated) of the controller 10 and/or the grinding machine 20.

In this way, the dressing estimation device 30 according to the embodiment inputs the grinding condition to be performed from now on for the grinding target workpiece related to the grinding process and the grindstone information of the grindstone selected by the operator including at least the present degree of necessity of dressing process from the control information of the controller 10 to the learned model 341 prior to the grinding process of the grinding machine 20. The dressing estimation device 30 estimates the degree of necessity of dressing process of the selected grindstone after the grinding process. The dressing estimation device 30 can detect whether a dressing process will be necessary or not during the grinding process in advance by comparing the estimated degree of necessity of dressing process with a threshold set in advance.

That is, the dressing estimation device 30 can detect a timing before the grinding process as an optimal timing to perform the dressing process on the grindstone when the degree of necessity of dressing process of the selected grindstone exceeds the threshold.

Moreover, using the learned model 341, the dressing estimation device 30 can detect an optimal timing to perform a dressing process on the selected grindstone or to replace the grindstone without setting the threshold for each material of the work material or each grindstone.

While an embodiment has been described, the dressing estimation device 30 and the machine learning device 40 are not limited to the above-described embodiment but modifications, improvements, and the like can be made within a range where the object can be attained.

<Modification 1>

In the above-described embodiment, although the machine learning device 40 is illustrated as a device different from the controller 10, the grinding machine 20, and the dressing estimation device 30, some or all functions of the machine learning device 40 may be included in the controller 10, the grinding machine 20, or the dressing estimation device 30.

<Modification 2>

In the above-described embodiment, although the dressing estimation device 30 is illustrated as a device different from the controller 10 and the grinding machine 20, some or all functions of the dressing estimation device 30 may be included in the controller 10 or the grinding machine 20.

Alternatively, some or all of the input unit 301, the estimation unit 302, the determination unit 303, and the storage unit 304 of the dressing estimation device 30 may be included in a server, for example. Moreover, the functions of the dressing estimation device 30 may be realized using a virtual server function or the like on a cloud.

Furthermore, the dressing estimation device 30 may be a distributed processing system in which the functions of the dressing estimation device 30 are distributed appropriately to a plurality of servers.

<Modification 3>

Figure 6:
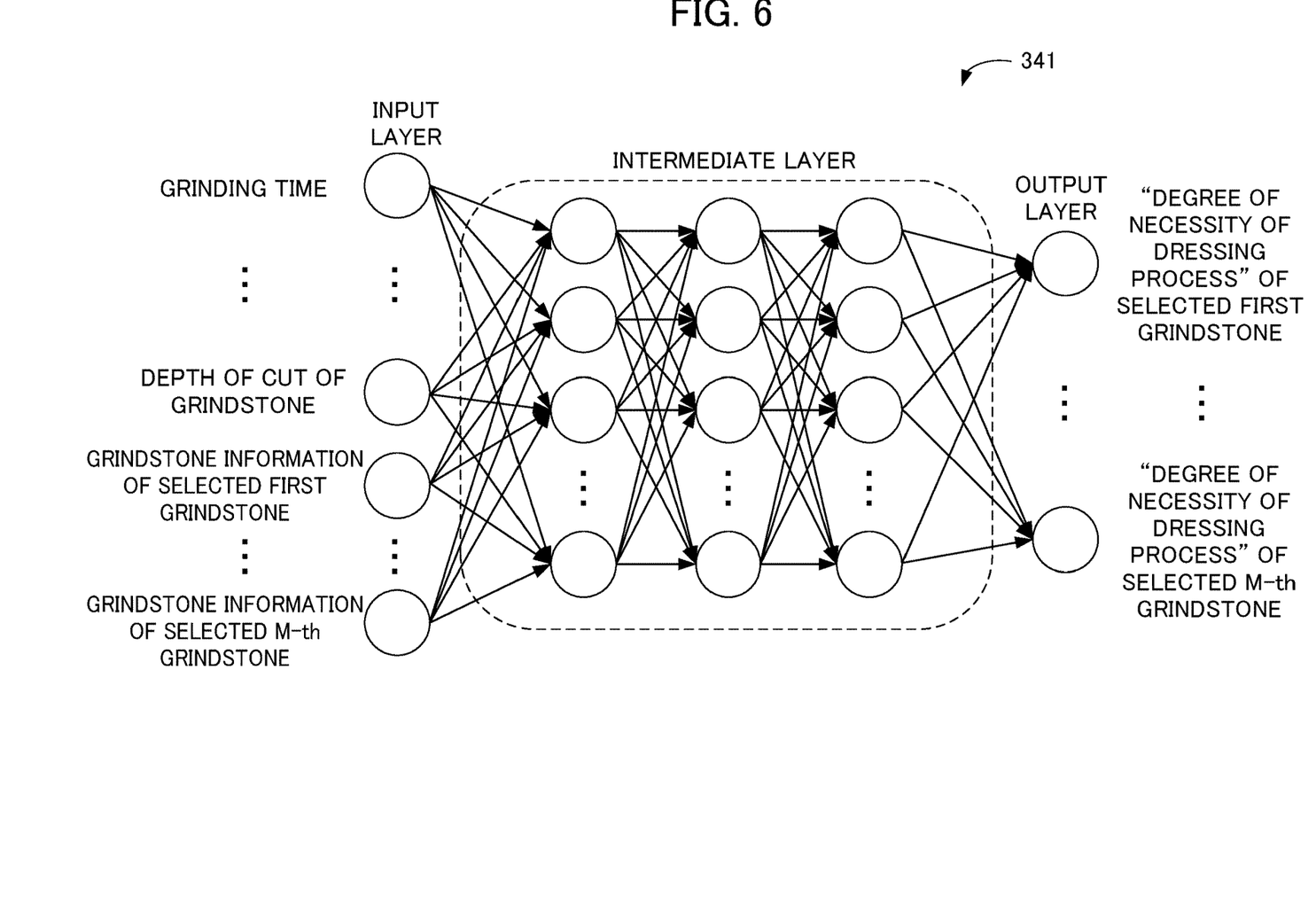
FIG. 6 is a diagram illustrating an example of a learned model provided to the dressing estimation device illustrated in FIG. 2.

In the above-described embodiment, although the learned model 341 illustrated in FIG. 3, for example, is a multi-layer neural network in which the grinding condition to be performed from now on with respect to a grindstone for a grinding target workpiece and the grindstone information of one grindstone are used as an input layer and the "degree of necessity of dressing process" is used as an output layer, there is no limitation thereto. For example, as illustrated in FIG. 6, the learned model 341 may be a neural network in which the grinding condition to be performed from now on and the grindstone information of a plurality of (M: M≥2) grindstones selected by the operator are used as an input layer and the "degrees of necessity of dressing process" of the M grindstones are used as an output layer.

In this way, when there are M grindstones usable for the grinding process to be performed from now on, the operator can estimate in parallel the "degrees of necessity of dressing process" of the M grindstones using the dressing estimation device 30 by selecting M grindstone IDs and can quickly select a grindstone appropriate for grinding. As a result, it is possible to improve the grinding efficiency.

FIG. 6 is a diagram illustrating an example of a learned model provided to the dressing estimation device 30 illustrated in FIG. 2.

The machine learning device 40 may construct the learned model 341 for each of the cases of two to M grindstones in advance, and the dressing estimation device 30 may select the learned model 341 corresponding to the number of grindstones selected by the operator.

<Modification 4>

For example, in the above-described embodiment, although the determination unit 303 of the dressing estimation device 30 determines a timing before the grinding process as a timing to perform a dressing process on the selected grindstone when the degree of necessity of dressing process of the grindstone selected by the operator after the grinding process is performed exceeds the threshold, there is no limitation thereto.

As described above, when there are a plurality of (for example, ten) grinding target workpieces included in the grinding condition, for example, the determination unit 303 may adjust the number of workpieces so that the degree of necessity of dressing process of the grindstone after the grinding process is performed does not exceed the threshold.

More specifically, for example, when a plurality of workpieces are grinded under the grinding condition to be performed from now on, and the degree of necessity of dressing process exceeds the threshold, the determination unit 303 may set the "grinding time for a grinding target work material" in the grinding condition to integer multiples (k times: k≥1) of the grinding time required for one workpiece (according to an instruction of the operator) and cause the estimation unit 302 to estimate the degree of necessity of dressing process of the grindstone to search for the value of k (for example, six) in which the degree of necessity of dressing process does not exceed the threshold.

The determination unit 303 determines a timing after the grinding process is performed for k workpieces, for example, as a timing to perform a dressing process on the selected grindstone. The numerical control system illustrated in FIG. 1 can stop the grinding machine 20 to perform a dressing process on the grindstone or replace the grindstone in a good stage to leave off, which is the determined timing.

In this way, the numerical control system can predict in advance the timing at which how much grinding is performed for dressing before grinding starts. The numerical control system can avoid occurrence of the necessity to perform a dressing process on a grindstone during a grinding process and avoid decrease in machining quality.

<Modification 5>

Figure 7:
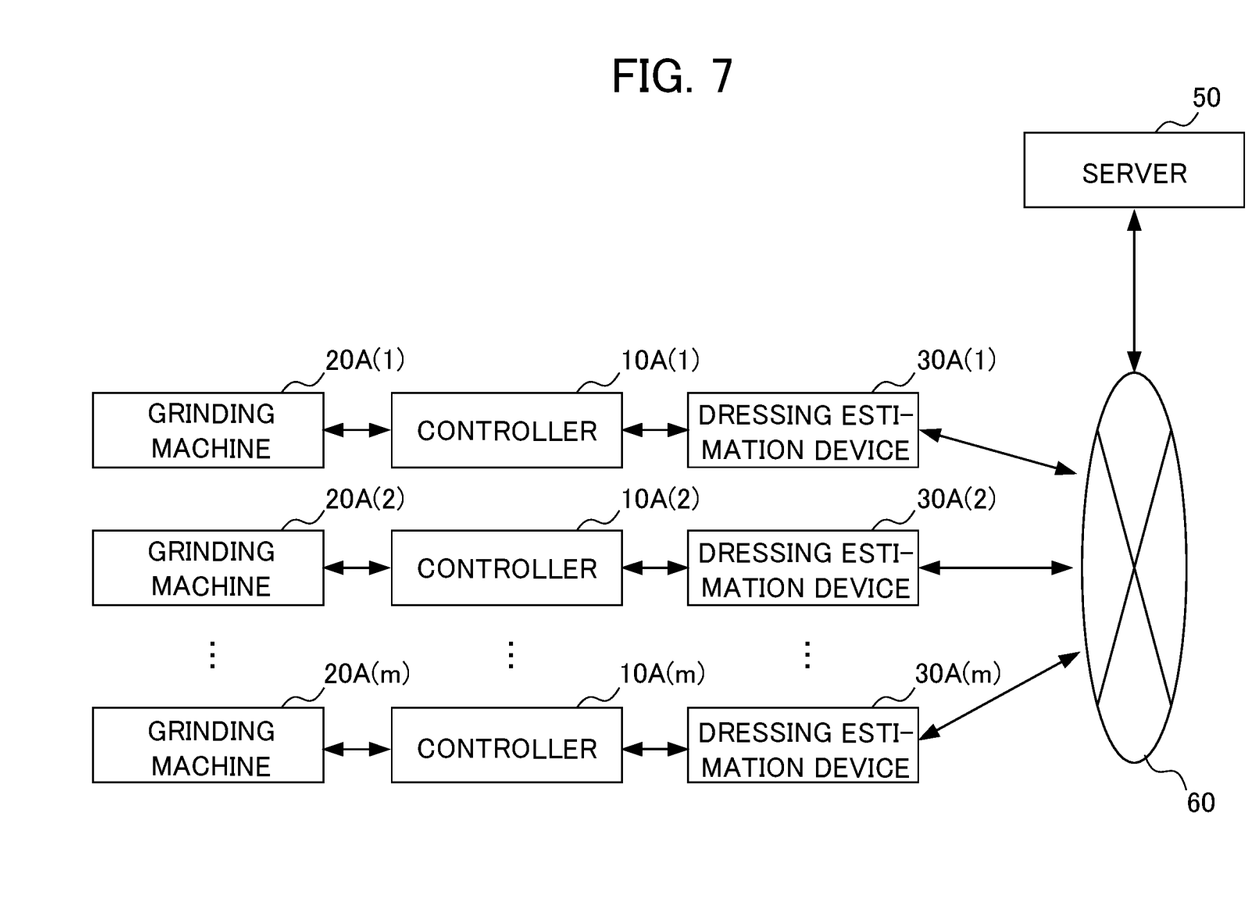
FIG. 7 is a diagram illustrating an example of a configuration of a numerical control system.

For example, in the above-described embodiment, although the dressing estimation device 30 estimates the degree of necessity of dressing process of the grindstone selected by the operator after the grinding process is performed under the grinding condition to be performed from now on acquired from one controller 10 using the learned model 341 provided from the machine learning device 40, there is no limitation thereto. For example, as illustrated in FIG. 7, the server 50 may store the learned model 341 generated by the machine learning device 40 and share the learned model 341 with m dressing estimation devices 30A(1) to 30A(m) (m is an integer of 2 or more) connected to the network 60. In this way, even when a new grinding machine, a new controller, and a new dressing estimation device are disposed, it is possible to apply the learned model 341.

The dressing estimation devices 30A(1) to 30A(m) are connected to controllers 10A(1) to 10A(m), respectively, and the controllers 10A(1) to 10A(m) are connected to grinding machines 20A(1) to 20A(m), respectively.

Moreover, the controllers 10A(1) to 10A(m) each correspond to the controller 10 in FIG. 1. The grinding machines 20A(1) to 20A(m) each correspond to the grinding machine 20 in FIG. 1. The dressing estimation devices 30A(1) to 30A(m) each correspond to the dressing estimation device 30 in FIG. 1.

Figure 8:
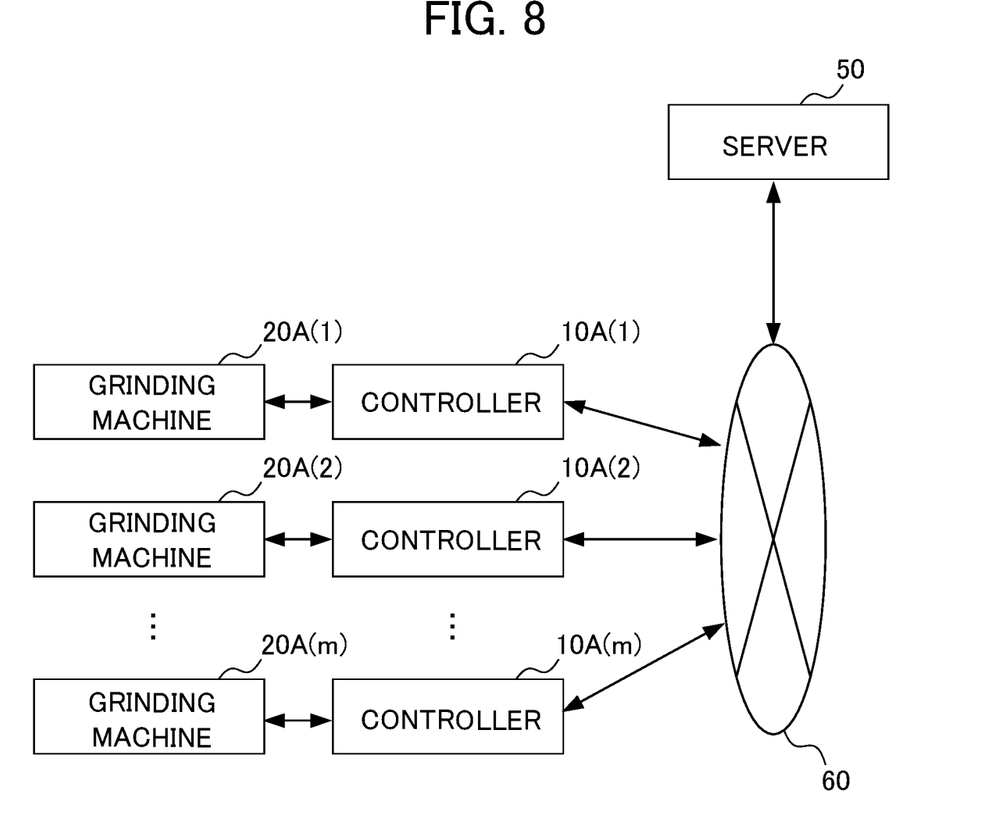
FIG. 8 is a diagram illustrating an example of a configuration of the numerical control system.

Alternatively, as illustrated in FIG. 8, the server 50 may operate as the dressing estimation device 30, for example, and may estimate the degree of necessity of dressing process of the grindstone under the grinding condition to be performed from now on with respect to each of the controllers 10A(1) to 10A(m) connected to the network 60. In this way, even when a new grinding machine and a new controller are disposed, it is possible to apply the learned model 341.

The functions included in the dressing estimation device 30 and the machine learning device 40 of the embodiment may be realized by hardware, software, or a combination thereof. Here, being realized by software means being realized by a computer reading and executing a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be provided to a computer by using any of various types of transitory computer readable media. Examples of the transitory computer readable media include electric signals, optical signals, and electromagnetic waves. A transitory computer readable medium can provide programs to a computer through a wired communication path such as an electrical cable, optical fiber, or the like, or a wireless communication path.

A step of describing programs to be recorded on a recording medium includes processing that is performed in a time series manner according to the order and processing that is performed in a parallel or independent manner even if the processing is not necessarily performed in a time series manner.

In other words, the machine learning device, the dressing estimation device, and the controller of the present disclosure can have various embodiments having the following configurations.

(1) A machine learning device 40 according to the present disclosure includes: an input data acquisition unit 401 that acquires input data including an arbitrary grinding condition for an arbitrary work material in a grinding process of an arbitrary grinding machine and grindstone information related to an arbitrary grindstone including at least a degree of necessity of dressing process indicating a degree of necessity of dressing before a grinding process is performed under the grinding condition; a label acquisition unit 402 that acquires label data indicating the degree of necessity of dressing process of the grindstone after the grinding process is performed under the grinding condition included in the input data; and a learning unit 403 that executes supervised learning using the input data acquired by the input data acquisition unit 401 and the label data acquired by the label acquisition unit 402, and generates a learned model 341.

According to the machine learning device 40, it is possible to generate the learned model 341 capable of detecting an optimal timing to perform dressing of a grindstone without the need to set a threshold for performing a dressing process for each grindstone and each material of a work material.

(2) The grinding condition may include a grinding time for one or more work materials.

By doing so, it is possible to avoid the occurrence of the necessity to perform a dressing process during a grinding process.

(3) A dressing estimation device 30 according to the present disclosure includes: a learned model 341 generated by the machine learning device 40; an input unit 301 that inputs a grinding condition for a grinding target work material related to the grinding process prior to a grinding process of a grinding machine and grindstone information related to a grindstone to be used in the grinding process, including at least the present degree of necessity of dressing process; and an estimation unit 302 that estimates a degree of necessity of dressing process after the grinding process is performed under the grinding condition related to the grinding process with respect to the grindstone to be used in the grinding process, and input by the input unit 301 using the learned model 341.

According to the dressing estimation device 30, it is possible to detect an optimal timing to perform dressing of a grindstone without the need to set a threshold for performing a dressing process for each grindstone and each material of a work material.

(4) The dressing estimation device may further include a determination unit 303 that determines a timing before the grinding process as a timing to perform the dressing process on the grindstone when the degree of necessity of dressing process of the grindstone estimated by the estimation unit 302 exceeds a threshold set in advance.

By doing so, the dressing estimation device 30 can avoid the occurrence of the necessity to perform a dressing process of a grindstone during a grinding process and avoid decrease in machining quality.

(5) The dressing estimation device 30 may further include a determination unit 303 that determines that the grinding condition related to the grinding process is to be changed so that the degree of necessity of dressing process of the grindstone does not exceed a threshold set in advance when the degree of necessity of dressing process of the grindstone estimated by the estimation unit 302 exceeds the threshold.

By doing so, it is possible to predict in advance the timing at which how much grinding is required for dressing before grinding starts.

(6) The determination unit 303 may adjust the number of grinding target work materials included in the grinding condition.

By doing so, it is possible to stop the grinding machine 20 to set the schedule for a dressing process or replacement of the grindstone in a stage where it is good to leave off the grinding process before the grinding starts.

(7) The learned model 341 may be provided in a server 50 connected so as to be accessible from the dressing estimation device 30 via a network 60.

By doing so, even when a new controller 10, a new grinding machine 20, and a new dressing estimation device 30 are disposed, it is possible to apply the learned model 341.

(8) The dressing estimation device may include the machine learning device 40.

By doing so, it is possible to obtain advantageous effects similar to those of any one of (1) to (7).

(9) A controller 10 of the present disclosure may include the dressing estimation device 30.

According to the controller 10, it is possible to obtain advantageous effect similar to those of any one of (1) to (8).

EXPLANATION OF REFERENCE NUMERALS

10: Controller
20: Grinding machine
30: Dressing estimation device
40: Machine learning device
301: Input unit
302: Estimation unit
303: Determination unit
341: Learned model
342: Grindstone management table
401: Input data acquisition unit
402: Label acquisition unit
403: Learning unit

What is claimed is:

1. A dressing estimation device comprising:
a learned model generated by the machine learning device;
an input unit that inputs a grinding condition for a grinding target work material related to the grinding process and a grindstone ID indicating a grindstone selected by an operator to be used in a grinding process of a grinding machine prior to the grinding process of the grinding machine and grindstone information related to the grindstone to be used in the grinding process, including at least the present degree of necessity of dressing process based on the input grindstone ID and a grindstone management table stored in a storage unit of the dressing estimation device;
an estimation unit that estimates a degree of necessity of dressing process after the grinding process is performed under the grinding condition related to the grinding process with respect to the grindstone to be used in the grinding process, input by the input unit using the learned model; and
a determination unit that determines that the grinding condition related to the grinding process is to be changed so that the degree of necessity of dressing process of the grindstone does not exceed a threshold set in advance when the degree of necessity of dressing process of the grindstone estimated by the estimation unit exceeds the threshold,
wherein the machine learning device comprises:
an input data acquisition unit that acquires input data including an arbitrary grinding condition for an arbitrary work material in a grinding process of an arbitrary grinding machine and grindstone information related to an arbitrary grindstone including at least a degree of necessity of dressing process indicating a degree of necessity of dressing before a grinding process is performed under the grinding condition;
a label acquisition unit that acquires label data indicating the degree of necessity of dressing process of the grindstone after the grinding process is performed under the grinding condition included in the input data; and
a learning unit that executes supervised learning using the input data acquired by the input data acquisition unit and the label data acquired by the label acquisition unit, and generates the learned model.

2. The dressing estimation device according to claim 1, wherein the grinding condition includes a grinding time for one or more work materials.

3. The dressing estimation device according to claim 1, wherein
the determination unit adjusts the number of grinding target work materials included in the grinding condition.

4. The dressing estimation device according to claim 1, wherein
the learned model is provided in a server connected so as to be accessible from the dressing estimation device via a network.

5. A dressing estimation device comprising:
a machine learning device;
a learned model generated by the machine learning device;
an input unit that inputs a grinding condition for a grinding target work material related to the grinding process and a grindstone ID indicating a grindstone selected by an operator to be used in a grinding process of a grinding machine prior to the grinding process of the grinding machine and grindstone information related to the grindstone to be used in the grinding process, including at least the present degree of necessity of dressing process based on the input grindstone ID and a grindstone management table stored in a storage unit of the dressing estimation device;
an estimation unit that estimates a degree of necessity of dressing process after the grinding process is performed under the grinding condition related to the grinding process with respect to the grindstone to be used in the grinding process, input by the input unit using the learned model; and
a determination unit that determines that the grinding condition related to the grinding process is to be changed so that the degree of necessity of dressing process of the grindstone does not exceed a threshold set in advance when the degree of necessity of dressing process of the grindstone estimated by the estimation unit exceeds the threshold, wherein the machine learning device comprises:

an input data acquisition unit that acquires input data including an arbitrary grinding condition for an arbitrary work material in a grinding process of an arbitrary grinding machine and grindstone information related to an arbitrary grindstone including at least a degree of necessity of dressing process indicating a degree of necessity of dressing before a grinding process is performed under the grinding condition;

a label acquisition unit that acquires label data indicating the degree of necessity of dressing process of the grindstone after the grinding process is performed under the grinding condition included in the input data; and a learning unit that executes supervised learning using the input data acquired by the input data acquisition unit and the label data acquired by the label acquisition unit, and generates the learned model.

6. A controller comprising a dressing estimation device, wherein the dressing estimation device comprises:

a learned model generated by a machine learning device;

an input unit that inputs a grinding condition for a grinding target work material related to the grinding process and a grindstone ID indicating a grindstone selected by an operator to be used in a grinding process of a grinding machine prior to the grinding process of the grinding machine and grindstone information related to the grindstone to be used in the grinding process, including at least the present degree of necessity of dressing process based on the input grindstone ID and a grindstone management table stored in a storage unit of the dressing estimation device;

an estimation unit that estimates a degree of necessity of dressing process after the grinding process is performed under the grinding condition related to the grinding process with respect to the grindstone to be used in the grinding process, input by the input unit using the learned model; and a determination unit that determines that the grinding condition related to the grinding process is to be changed so that the degree of necessity of dressing process of the grindstone does not exceed a threshold set in advance when the degree of necessity of dressing process of the grindstone estimated by the estimation unit exceeds the threshold, wherein the machine learning device comprises:

an input data acquisition unit that acquires input data including an arbitrary grinding condition for an arbitrary work material in a grinding process of an arbitrary grinding machine and grindstone information related to an arbitrary grindstone including at least a degree of necessity of dressing process indicating a degree of necessity of dressing before a grinding process is performed under the grinding condition;

a label acquisition unit that acquires label data indicating the degree of necessity of dressing process of the grindstone after the grinding process is performed under the grinding condition included in the input data; and a learning unit that executes supervised learning using the input data acquired by the input data acquisition unit and the label data acquired by the label acquisition unit, and generates the learned model.

\* \* \* \* \*